US012808753B2

(12) United States Patent
Perez Perez et al.

(10) Patent No.: US 12,808,753 B2

(45) Date of Patent: Nov. 24, 2026

(54) ENGINE EFFECTOR POSITION MEASUREMENT

(71) Applicant: General Electric Company, Schenectady, NY (US)

(72) Inventors: Gerardo Perez Perez, Queretaro (MX); Tyler S. Thompson, Milford, OH (US); Nicholas M. Daggett, Camden, ME (US); Scott Nicholas Rose, Blue Ash, OH (US)

(73) Assignee: General Electric Company, Evendale, OH (US)

( * ) Notice: Subject to any disclaimer, the term of this patent is extended or adjusted under 35 U.S.C. 154(b) by 338 days.

(21) Appl. No.: 18/442,893

(22) Filed: Feb. 15, 2024

(65) Prior Publication Data

US 2025/0264376 A1 Aug. 21, 2025

(51) Int. Cl.

| | |
|---|---|
| ***G01M 15/14*** | (2006.01) |
| ***F01D 21/00*** | (2006.01) |
| ***G01S 7/52*** | (2006.01) |
| ***G01S 15/10*** | (2006.01) |

(52) U.S. Cl.

CPC ........... *G01M 15/14* (2013.01); *F01D 21/003* (2013.01); *G01S 7/52004* (2013.01); *G01S 15/10* (2013.01); *F05D 2260/83* (2013.01)

(58) Field of Classification Search

CPC ...... G01M 15/14; F01D 21/003; F01D 11/20; F01D 17/02; G01S 7/52004; G01S 15/10; F05D 2260/83

See application file for complete search history.

(56) References Cited

U.S. PATENT DOCUMENTS

| | | | | |
|---|---|---|---|---|
| 3,873,235 | A | 3/1975 | Mendelson | |
| 3,886,884 | A | 6/1975 | Stark | |
| 4,928,241 | A | 5/1990 | Day | |
| 7,645,970 | B2 | 1/2010 | Adams | |
| 7,755,210 | B2 | 7/2010 | Kammer | |
| 10,036,367 | B2 | 7/2018 | Hansen | |
| 10,353,401 | B2 | 7/2019 | Tan | |
| 11,130,567 | B2 | 9/2021 | Waaramaa | |
| 11,364,993 | B2 | 6/2022 | Sumerel | |
| 2009/0123272 | A1* | 5/2009 | Love | F02B 37/24 700/282 |
| 2018/0135527 | A1* | 5/2018 | Asari | F02C 7/057 |
| 2020/0018241 | A1* | 1/2020 | Boeck | F01D 17/04 |

(Continued)

FOREIGN PATENT DOCUMENTS

| | | | |
|---|---|---|---|
| EP | 1988258 B1 * | 1/2016 | F01D 17/162 |
| FR | 3127024 | 3/2023 | |
| FR | 3127025 | 3/2023 | |

(Continued)

*Primary Examiner* — Francis C Gray

(74) *Attorney, Agent, or Firm* — Smith, Gambrell & Russell LLP

(57) ABSTRACT

A system for engine effector position measurement including an effector actuator of an engine, the effector actuator comprising a house and one or more movable elements for changing an effector position of an effector coupled to the effector actuator and a time-of-flight (TOF) sensor within a housing of the effector actuator and positioned to measure a distance between the TOF sensor and a reflecting surface within the housing to determine the effector position of the effector.

20 Claims, 5 Drawing Sheets

(56) References Cited

U.S. PATENT DOCUMENTS

| | | | | |
|---|---|---|---|---|
| 2021/0246830 | A1* | 8/2021 | Yerram | F02C 9/00 |
| 2022/0214452 | A1* | 7/2022 | Pulley | G01S 15/06 |

FOREIGN PATENT DOCUMENTS

| | | |
|---|---|---|
| FR | 3127269 | 3/2023 |
| FR | 3129375 | 5/2023 |
| FR | 3129428 | 5/2023 |
| FR | 3129432 | 5/2023 |
| FR | 3129436 | 5/2023 |
| FR | 3129690 | 6/2023 |
| FR | 3129970 | 6/2023 |
| FR | 3129972 | 6/2023 |
| FR | 3130313 | 6/2023 |
| FR | 3130323 | 6/2023 |
| FR | 3130747 | 6/2023 |
| FR | 3130874 | 6/2023 |
| FR | 3130875 | 6/2023 |
| FR | 3130877 | 6/2023 |
| FR | 3130879 | 6/2023 |
| FR | 3130894 | 6/2023 |
| FR | 3130895 | 6/2023 |
| FR | 3130896 | 6/2023 |
| FR | 3130897 | 6/2023 |
| FR | 3132279 | 8/2023 |
| FR | 3132729 | 8/2023 |
| FR | 3132743 | 8/2023 |
| FR | 3133367 | 9/2023 |
| FR | 3133368 | 9/2023 |

* cited by examiner

ENGINE EFFECTOR POSITION MEASUREMENT

FIELD OF THE DISCLOSURE

The present subject matter relates generally to engines, and specifically to engine effector position measurement.

BACKGROUND

Turbine engines can include variable geometry effectors such as variable pitch blades that can be actuated to affect engine output and fuel consumption. Precise control of these effectors is important in optimizing engine performance.

BRIEF DESCRIPTION OF THE DRAWINGS

A full and enabling description of the present disclosure, including the best mode thereof, directed to one of ordinary skill in the art, is set forth in the specification, which makes reference to the appended figures, in which.

DETAILED DESCRIPTION

Figure 1:
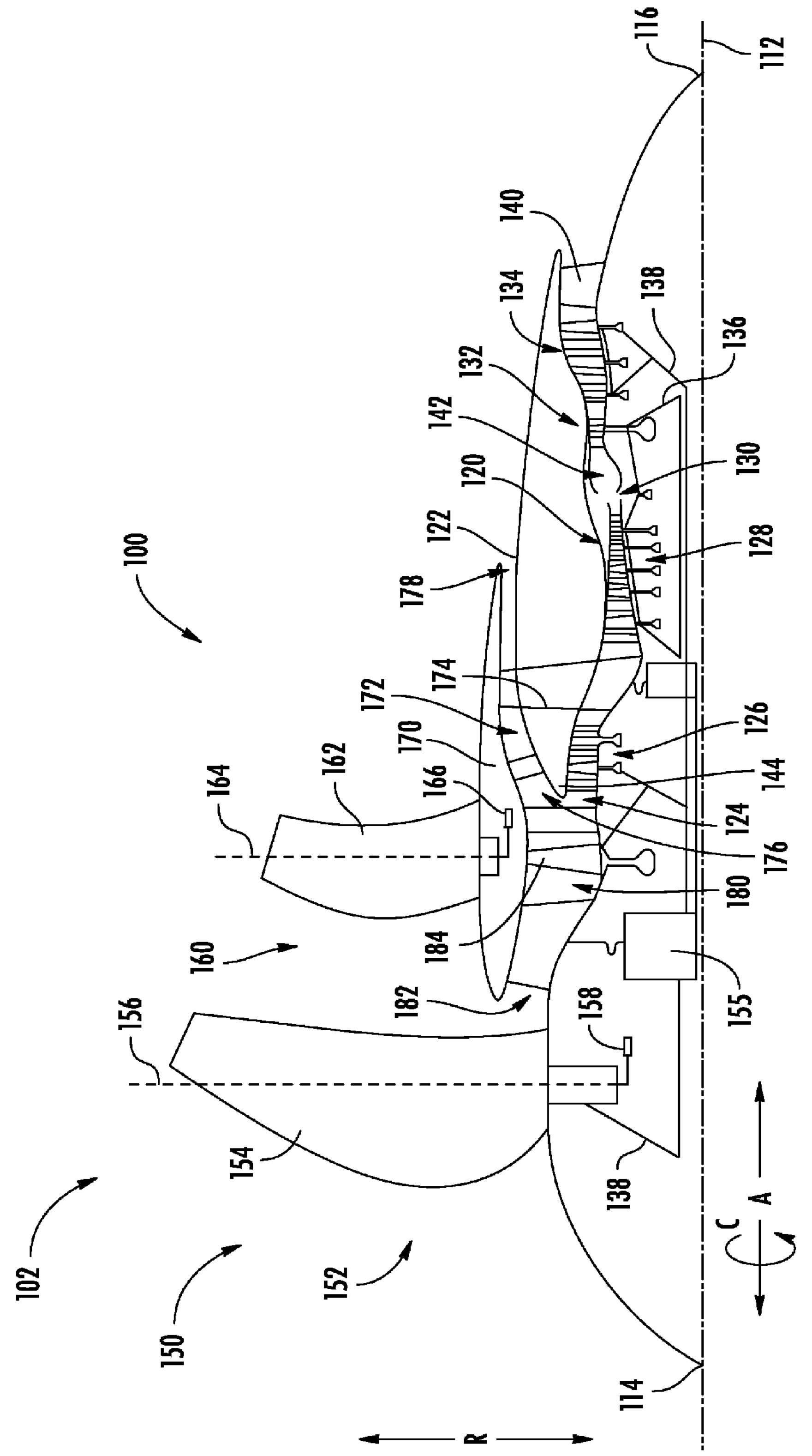
FIG. 1 is a cross-sectional side view of an embodiment of a propulsion system according to some embodiments.

Reference now will be made in detail to embodiments of the present disclosure, one or more examples of which are illustrated in the drawings. Each example is provided by way of explanation of the present disclosure, not limitation of the disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

As used herein, the terms "first," "second," "third," etc. may be used interchangeably to distinguish one component from another and are not intended to signify location or importance of the individual components.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a," "an," and "the" include plural referents unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "about," "approximately," "almost," and "substantially" are not to be limited to the precise value specified. In some instances, the approximating language may correspond to the precision of an instrument for measuring the value. For example, the approximating language may refer to being within a 1, 2, 4, 10, 15, or 20 percent margin. These approximating margins may apply to a single value, either or both endpoints defining numerical ranges, and/or the margin for ranges between endpoints. Here and throughout the specification and claims, range limitations are combined and interchanged. Such ranges are identified and include all the sub-ranges contained therein unless context or language indicates otherwise. For example, all ranges disclosed herein are inclusive of the endpoints, and the endpoints are independently combinable with each other.

For variable geometry engines, variable geometry effectors, such as variable pitch vanes and blades, can be controlled based on a feedback loop including an effector position sensor such as a pitch measurement sensor. In such engines, the accuracy of the sensor affects the control precision of the engine variable geometry. The sensor design also affects the overall form, reliability, and durability of the engine.

Effector position measurement can be made via mechanical linkage, optical sensors, or magnetic sensors. However, existing methods often face challenges such as mechanical wear and tear, susceptibility to environmental conditions, and interference from other engine components.

In some aspects, an effector position measurement system is provided for a variable geometry propulsion application. The system may include associated hardware, one or more sensing elements, associated signal processing software or hardware modules, and a computing device for obtaining effector position such as pitch angle (also known as beta). In some embodiments, a position measurement system determines actuator position through measuring axial displacement of an actuation system.

In some embodiments, the system measures pitch angle through one or more ultrasonic sensors located inside the actuator cylinder, measuring the distance to an associated surface inside the actuator where the mechanical wave is reflected. The actuator cylinder may be filled with pressurized oil or other working fluid. By measuring the "time of flight" of the mechanical wave traveling from the sensor to the reflecting surface and back, axial displacement (and hence the effector position) may be obtained.

In some embodiments, the sensing system is configured for self-calibration to be more robust and accurate in different mediums of varying properties. In some embodiments, the sensor includes a reflecting surface at a known distance from the sensor for calibration. In some embodiments, the sensor system includes an additional layer of a known medium adjacent to the reflecting surface where the total energy is distributed such that some energy is reflected, and part of the energy goes through the additional medium towards the reflecting surface. The delta time between the time of flight of the reflected signals on the reference medium and the reflecting surface may be used to calibrate variations in time of flight for distance measurements.

Referring now to FIG. 1, a schematic cross-sectional view of a gas turbine engine 100 is provided according to an example embodiment of the present disclosure. Effector position measuring methods and systems described herein may be implemented within one or more actuators of the engine 100.

It will be appreciated, however, that the exemplary single rotor unducted engine 100 depicted in FIG. 1 is by way of example only, and that in other exemplary embodiments, the engine 100 may have any other suitable configuration, including, for example, any other suitable number of shafts or spools, turbines, compressors, etc.; fixed-pitch blades, a direct-drive configuration (i.e., may not include the gearbox 155); etc. For example, in other exemplary embodiments, the engine 100 may be a three-spool engine, having an intermediate speed compressor and/or turbine. In such a configuration, it will be appreciated that the terms "high" and "low," as used herein with respect to the speed and/or pressure of a turbine, compressor, or spool are terms of convenience to differentiate between the components, but do not require any specific relative speeds and/or pressures, and are not exclusive of additional compressors, turbines, and/or spools or shafts.

Additionally, or alternatively, in other exemplary embodiments, any other suitable gas turbine engine may be provided. For example, in other exemplary embodiments, the gas turbine engine may be a turboshaft engine, a turboprop engine, a turbojet engine, a rotorcraft engine, a ducted engine with variable pitch blades, etc. Moreover, for example, although the engine is depicted as a single unducted rotor engine, in other embodiments, the engine may include a multi-stage open rotor configuration or a ducted engine, and aspects of the disclosure described herein below may be incorporated therein.

FIG. 1 provides an engine 100 having a rotor assembly with a single stage of unducted rotor blades. In such a manner, the rotor assembly may be referred to herein as an "unducted fan," or the entire gas turbine engine 100 may be referred to as an "unducted engine," or an engine having an open rotor propulsion system 102. In addition, the engine of FIG. 1 includes a mid-fan stream extending from the compressor section to a rotor assembly flowpath over the turbomachine, as will be explained in more detail below. It is also contemplated that, in other exemplary embodiments, the present disclosure is compatible with an engine having a duct around the unducted fan. It is also contemplated that, in other exemplary embodiments, the present disclosure is compatible with a turbofan engine having a third stream as described herein.

For reference, the gas turbine engine 100 defines an axial direction A, a radial direction R, and a circumferential direction C. Moreover, the gas turbine engine 100 defines an axial centerline or longitudinal axis 112 that extends along the axial direction A. In general, the axial direction A extends parallel to the longitudinal axis 112, the radial direction R extends outward from and inward to the longitudinal axis 112 in a direction orthogonal to the axial direction A, and the circumferential direction extends three hundred sixty degrees (360°) around the longitudinal axis 112. The gas turbine engine 100 extends between a forward end 114 and an aft end 116, e.g., along the axial direction A.

The gas turbine engine 100 includes a turbomachine 120, also referred to as a core of the gas turbine engine 100, and a rotor assembly, also referred to as a fan section 150, positioned upstream thereof. Generally, the turbomachine 120 includes, in serial flow order, a compressor section, a combustion section, a turbine section, and an exhaust section. Particularly, as shown in FIG. 1, the turbomachine 120 includes a core cowl 122 that defines an annular core inlet 124. The core cowl 122 further encloses at least in part a low pressure system and a high pressure system. For example, the core cowl 122 depicted encloses and supports at least in part a booster or low pressure ("LP") compressor 126 for pressurizing the air that enters the turbomachine 120 through core inlet 124. A high pressure ("HP"), multi-stage, axial-flow compressor 128 receives pressurized air from the LP compressor 126 and further increases the pressure of the air. The pressurized air stream flows downstream to a combustor 130 of the combustion section where fuel is injected into the pressurized air stream and ignited to raise the temperature and energy level of the pressurized air and produce high energy combustion products.

It will be appreciated that as used herein, the terms "high/low speed" and "high/low pressure" are used with respect to the high pressure/high speed system and low pressure/low speed system interchangeably. Further, it will be appreciated that the terms "high" and "low" are used in this same context to distinguish the two systems, and are not meant to imply any absolute speed and/or pressure values.

The high energy combustion products flow from the combustor 130 downstream to a high pressure turbine 132. The high pressure turbine 132 drives the high pressure compressor 128 through a high pressure shaft 136. In this regard, the high pressure turbine 132 is drivingly coupled with the high pressure compressor 128. The high energy combustion products then flow to a low pressure turbine 134. The low pressure turbine 134 drives the low pressure compressor 126 and components of the fan section 150 through a low pressure shaft 138. In this regard, the low pressure turbine 134 is drivingly coupled with the low pressure compressor 126 and components of the fan section 150. The LP shaft 138 is coaxial with the HP shaft 136 in this example embodiment. After driving each of the turbines 132, 134, the combustion products exit the turbomachine 120 through a core or turbomachine exhaust nozzle 140.

Accordingly, the turbomachine 120 defines a working gas flowpath or core duct 142 that extends between the core inlet 124 and the turbomachine exhaust nozzle 140. The core duct 142 is an annular duct positioned generally inward of the core cowl 122 along the radial direction R. The core duct 142 (e.g., the working gas flowpath through the turbomachine 120) may be referred to as a second stream.

The fan section 150 includes a fan 152, which is the primary fan in this example embodiment. For the depicted embodiment of FIG. 1, the fan 152 is an open rotor or unducted fan 152. As depicted, the fan 152 includes an array of fan blades 154. The fan blades 154 are rotatable, e.g., about the longitudinal axis 112. In FIG. 1, the fan 152 is drivingly coupled with the low pressure turbine 134 via the LP shaft 138. The fan 152 can be directly coupled with the LP shaft 138, e.g., in a direct-drive configuration. However, for the embodiments shown in FIG. 1, the fan 152 is coupled with the LP shaft 138 via a speed reduction gearbox 155, e.g., in an indirect-drive or geared-drive configuration.

Moreover, the fan blades 154 can be arranged in equal spacing around the longitudinal axis 112. Each fan blade 154 has a root and a tip and a span defined therebetween. Each fan blade 154 defines a central blade axis 156. For this embodiment, each fan blade 154 of the fan 152 is rotatable about their respective central blade axis 156, e.g., in unison with one another. One or more actuators 158 are provided to facilitate such rotation and therefore may be used to change a pitch of the fan blades 154 about their respective central blade axis 156.

The fan section 150 further includes a fan guide vane array 160 that includes fan guide vanes 162 (only one shown in FIG. 1) disposed around the longitudinal axis 112. For this embodiment, the fan guide vanes 162 are not rotatable about the longitudinal axis 112. Each fan guide vane 162 has a root and a tip and a span defined therebetween. The fan guide vanes 162 may be unshrouded as shown in FIG. 1 or, alternatively, may be shrouded, e.g., by an annular shroud spaced outward from the tips of the fan guide vanes 162 along the radial direction R or attached to the fan guide vanes 162.

Each fan guide vane 162 defines a central blade axis 164. For this embodiment, each fan guide vane 162 of the fan guide vane array 160 is rotatable about their respective central blade axis 164, e.g., in unison with one another. One or more actuators 166 are provided to facilitate such rotation and therefore may be used to change a pitch of the fan guide vane 162 about their respective central blade axis 164. However, in other embodiments, each fan guide vane 162 may be fixed or unable to be pitched about its central blade axis 164. The fan guide vanes 162 are mounted to a fan cowl 170.

As shown in FIG. 1, in addition to the fan 152, which is unducted, a ducted fan 184 is included aft of the fan 152, such that the gas turbine engine 100 includes both a ducted and an unducted fan which both serve to generate thrust through the movement of air without passage through at least a portion of the turbomachine 120 (e.g., the HP compressor 128 and combustion section for the embodiment depicted). The ducted fan 184 may be at about the same axial location as the fan blade 154 or the vanes 162, and radially inward of the fan blade 154 or the vanes 162. The ducted fan 184, for the embodiment depicted, is driven by the low pressure turbine 134 (e.g., coupled to the LP shaft 138).

The fan cowl 170 annularly encases at least a portion of the core cowl 122 and is generally positioned outward of at least a portion of the core cowl 122 along the radial direction R. Particularly, a downstream section of the fan cowl 170 extends over a forward portion of the core cowl 122 to define a fan flow path or fan duct 172. The fan flowpath or fan duct 172 may be referred to as a third stream of the gas turbine engine 100.

Incoming air may enter through the fan duct 172 through a fan duct inlet 176 and may exit through a fan exhaust nozzle 178 to produce propulsive thrust. The fan duct 172 is an annular duct positioned generally outward of the core duct 142 along the radial direction R. The fan cowl 170 and the core cowl 122 are connected together and supported by a plurality of substantially radially-extending, circumferentially-spaced stationary struts 174 (only one shown in FIG. 1). The stationary struts 174 may each be aerodynamically contoured to direct air flowing thereby. Other struts in addition to the stationary struts 174 may be used to connect and support the fan cowl 170 and/or core cowl 122. In many embodiments, the fan duct 172 and the core duct 142 may at least partially co-extend (generally axially) on opposite sides (e.g., opposite radial sides) of the core cowl 122. For example, the fan duct 172 and the core duct 142 may each extend directly from a leading edge 144 of the core cowl 122 and may partially co-extend generally axially on opposite radial sides of the core cowl.

The gas turbine engine 100 also defines or includes an inlet duct 180. The inlet duct 180 extends between an engine inlet 182 and the core inlet 124/fan duct inlet 176. The engine inlet 182 is defined generally at the forward end of the fan cowl 170 and is positioned between the fan 152 and the fan guide vane array 160 along the axial direction A. The inlet duct 180 is an annular duct that is positioned inward of the fan cowl 170 along the radial direction R. Air flowing downstream along the inlet duct 180 is split, not necessarily evenly, into the core duct 142 and the fan duct 172 by a splitter or leading edge 144 of the core cowl 122. The inlet duct 180 is wider than the core duct 142 along the radial direction R. The inlet duct 180 is also wider than the fan duct 172 along the radial direction R.

Figure 2:
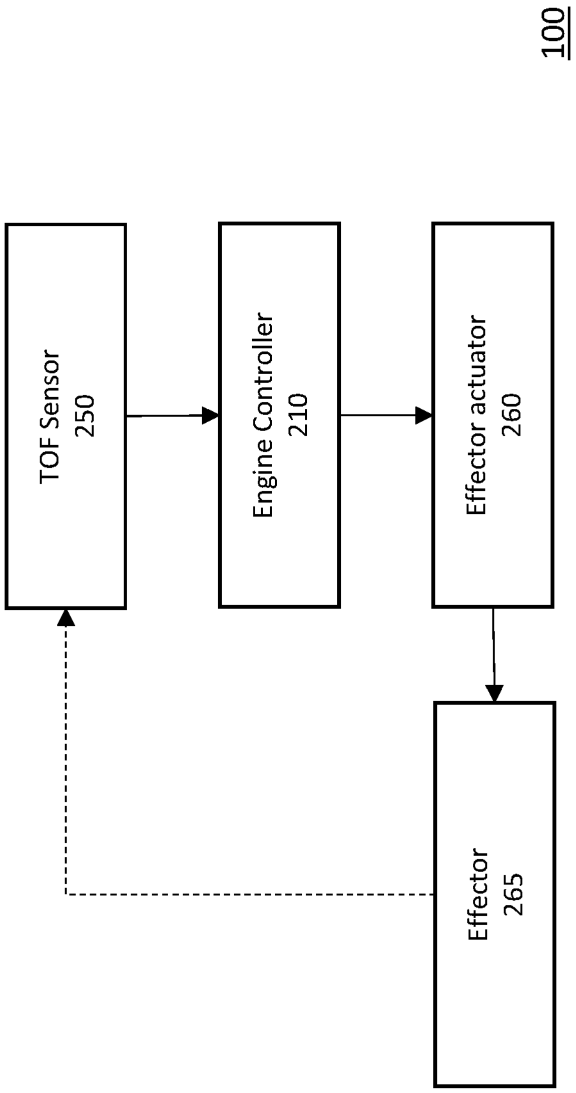
FIG. 2 is a simplified block diagram of an engine control system according to some embodiments.

Next referring to FIG. 2, a block diagram of an implementation of the engine 100 is shown. The engine 100 includes an engine controller 210 configured to receive input from a time-of-flight (TOF) sensor 250 and control the position of one or more effectors 265 via effector actuators 260. In some embodiments, the engine controller 210 includes a processor and one or more memory storage devices storing executable codes that cause the processor to perform one or more steps described with reference to FIG. 3 herein. The engine controller 210 may be configured to send control signals to the effector actuator 260 based on effector positions determined according to signals from the TOF sensor 250. In some embodiments, the engine controller 210 is a processor-based control system of an engine, such as a full-authorization digital engine control ("FADEC") of the engine 100. In some embodiments, the engine controller 210 may include an effector control circuit separate from the FADEC and/or an effector control software module executed by the FADEC. In some embodiments, the engine controller 210 is configured to change the position of the effector 265 in response to a signal (e.g., throttle) from an aircraft controller and/or based on a predetermined schedule. In some embodiments, to change the effector 265 to a select position, the engine controller 210 may incrementally increase or decrease an angle of the effector 265 via effector actuator 260 until the sensor 250 senses effector 265 at the select position. It should be noted that FIG. 2 is only a simplified block diagram, the engine controller 210 may further be configured to control other engine components.

The effector actuator 260 is an engine component that physically alters the position of an effector 265. In some embodiments, the effector actuator 260 includes components for converting electrical power to effector 265 movement based on a signal received from the engine controller 210. In some embodiments, the effector 265 may include variable geometry devices with geometry (e.g., pitch) that can be physically manipulated by the effector actuator 260 to effect thrust or airflow of the engine 100. In some embodiments, the effector actuator 260 includes a blade pitch actuator, a stator vane actuator, an inlet guide vane pitch actuator, an outlet guide vane pitch actuator, a bleed valve actuator, or a variable nozzle actuator. In some embodiments, the effector actuator 260 is coupled to rotating fan blades of the engine such as fan blade 154 described with reference to FIG. 1. In some embodiments, the effector actuator 260 is coupled to stationary vanes of the engine such as fan guide vanes 162 described with reference to FIG. 1. In some embodiments, the effector actuator 260 may be actuator 158 or actuator 166 described with reference to FIG. 1. In some embodiments, the effector 265 may include one or more of variable pitch blades, variable stator vanes, inlet guide vanes, outlet guide vanes, a bleed valve, a variable nozzle, etc.

The effector actuator 260 may include one or more static portions and one or more movable elements. Generally, the static portion remains in the same position relative to the housing of the effector actuator 260 and/or the engine 100. For example, the static portion may include a part of the housing of the effector actuator 260 and/or a mount coupled to the housing. The movable element may generally be an element that moves relative to the static portion with the actuation of the effector 265. In some embodiments, the movable element is a linear motion component of the effector actuator. For example, the movable element may be a piston rod, a crank arm, or a stem that linearly displaces with the changing of the effector position. In some embodiments, in addition to linear displacement, the movable element is also rotating within the housing of the effector actuator. For example, the movable element may be part of the actuator 158 coupled to and rotates with the rotating fan blades of the fan 152.

The TOF sensor 250 is generally positioned to measure the distance from the TOF sensor 250 to a reflecting surface within the effector actuator 260. The TOF sensor 250 is configured to send out an energy wave (e.g., ultrasound) through a medium (e.g., working fluid) towards a reflecting surface and measures the time for the wave to travel to the reflecting surface and back to the sensor. The travel time is then converted to a distance based on a known or calibrated speed of the wave through the medium. In some embodiments, the TOF sensor 250 is an ultrasonic range sensor such as a MEMS (micro-electromechanical system) PMUT (Piezoelectric Micromachined Ultrasonic Transducer) sensor. In some embodiments, the TOF sensor 250 may include other types of range sensors, such as an optical, laser, acoustic, and/or electromagnetic TOF sensor.

Figure 4A:
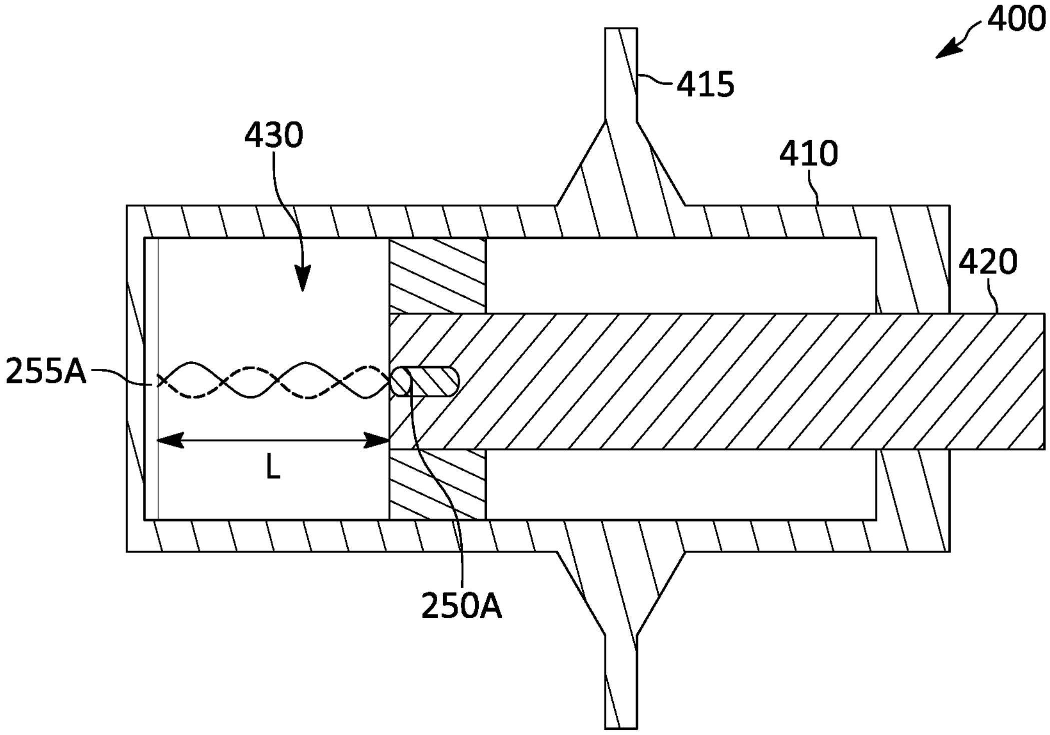
FIGS. 4A and 4B are illustrations of engine effectors in accordance with some embodiments.

In some embodiments, the TOF sensor 250 is mounted on a movable element of the effector actuator 260 and the reflecting surface is a surface of the static portion of the effector actuator 260. For example, in FIG. 4A, a piston 400 representing an effector actuator 260 is shown. The piston 400 includes a cylinder 410 and a piston rod 420. The cylinder 410 encloses a cavity 430 filled with a working fluid (e.g., fluid oil, gas, air, water or oil-based solution, etc.) and is coupled to kinematics 415 for affecting the position of an effector 265. In the embodiment shown in FIG. 4A, the sensor 250A is mounted on the movable piston rod 420 and the reflecting surface 255A is a static surface of the cylinder 410.

Figure 4B:
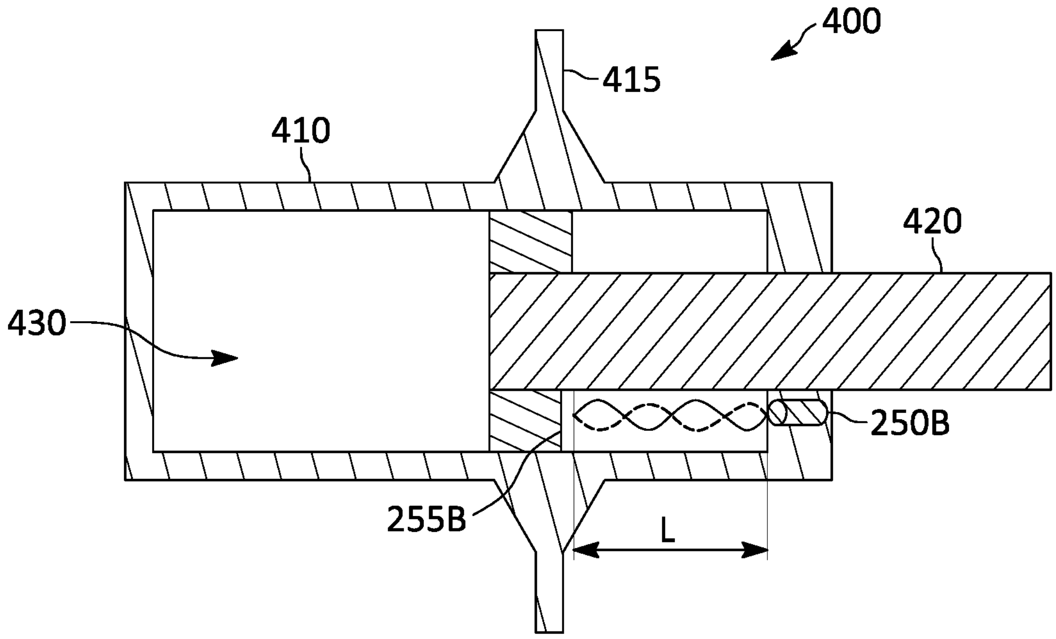

In some embodiments, the TOF sensor 250 is mounted on a static portion of the effector actuator 260 and the reflecting surface is a surface of a movable element of the effector actuator 260. For example, as shown in FIG. 4B, the sensor 250B may be mounted on the cylinder 410 of the piston 400 and the reflecting surface 255B may be part of the piston rod 420.

In some embodiments, the engine 100 further includes a calibration mechanism to calibrate the distance measurement of the TOF sensor 250 to account for variations in the speed of the wave traveling through the working fluid at different temperatures, pressures, and aeration levels. The calibration mechanism may include a calibration surface and/or a second calibration TOF sensor. In some embodiments, the calibration mechanism may include operating condition sensors and a software algorithm. Further details of example calibration mechanisms are described with reference to FIG. 3, FIGS. 5A, and 5B herein.

Figure 3:
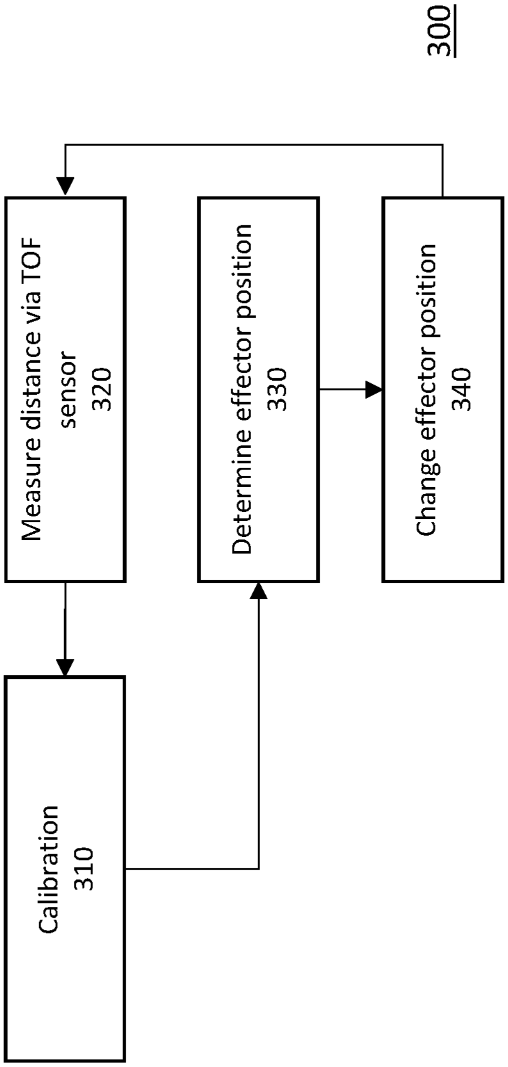
FIG. 3 is a flow diagram of a method for effector position measurement and control according to some embodiments.

Next referring to FIG. 3, a method 300 for engine effector position measurement and control is shown. In some embodiments, one or more steps of FIG. 3 are performed with a processor-based control system of an engine, such as the engine controller 210 of the engine 100.

In step 320, the distance between a TOF sensor 250 within a housing of an effector actuator 260 and a reflecting surface is measured. The TOF sensor 250 may be an ultrasonic range sensor such as a MEMS PMUT sensor. In some embodiments, the TOF sensor 250 may be other types of sensors capable of measuring distance through a medium. In some embodiments, the distance is measured based on TOF=2*L/C, wherein L represents length and C represents speed of sound in the medium.

In some applications of the described system and method, the medium through which the TOF sensor 250 measures the distance includes a primary medium with an oil temperature of between −40° F. to 300° F. and a pressure of up to about 2000 psia. In some embodiments, the oil temperature may be up to 320° F. or 350° F. The speed of sound in the working fluid may be around 1,450 m/s in ambient conditions. However, the speed of sound may vary up to ~30% based on operating conditions (e.g., temperature, pressure, aeration, etc.). The actuator stroke may be 0.5 to 7.0 inches (1.27 to 17.78 centimeters), in which case the total travel distance of the TOF sensor wave is two times the stroke, which is around 1 to 14 inches (2.54 to 35.56 centimeters). The TOF of the sensor wave from the sensor to the reflecting surface and back may be 17.5 to 242.5 us (microseconds). In some embodiments, with up to 30% tolerance, the TOF may be between 12.2 us to 314.4 us. The carrier frequency range may be 1 to 10 megahertz (MHz). In some embodiments, the carrier frequency range may be 1 to 20 MHz. In some embodiments, the carrier frequency range may be selected based on the medium and length to be measured to increase resolution/accuracy and reduce attenuation. In some embodiments, the engine controller 210 may include circuitry capable of computing TOF with a resolution of 1 microsecond (us) to obtain accuracies of around 0.75 mm in oil. For a six-inch (15.24 cm) stroke actuation, such processor provides around 0.5% in accuracy due to the resolution. For a seven-inch (17.78 centimeters) stroke actuation, such processor provides around 0.4% accuracy. In some embodiments, the TOF may have a field of view (FoV) of 5° or lower, as the location of the reflecting surface is known and aligned with the sensor.

In some embodiments, in step 310, a calibration is performed. In some embodiments, the calibration may be based on determining the speed of the wave through a medium. As described above, operating conditions of the effector actuator 260 may affect the speed of a wave through the working fluid of the effector actuator 260. To obtain an accurate distance measurement, the engine controller 210 may calibrate the measured TOF in step 310. In some embodiments, the speed may be determined via the operating conditions of the effector actuator 260. For example, the engine 100 and/or the effector actuator 260 may include one or more sensors for measuring operating condition (e.g., temperature, pressure, aeration, etc.). The measured operating conditions may be used to determine the speed of the sensor wave in the medium. The distance is then calculated based on the TOF measured by the effector actuator 260 and the determined speed under the measured conditions. In some embodiments, the speed of the wave in the medium may be determined based on an equation or a lookup table using the measured operating conditions.

Figure 5A:
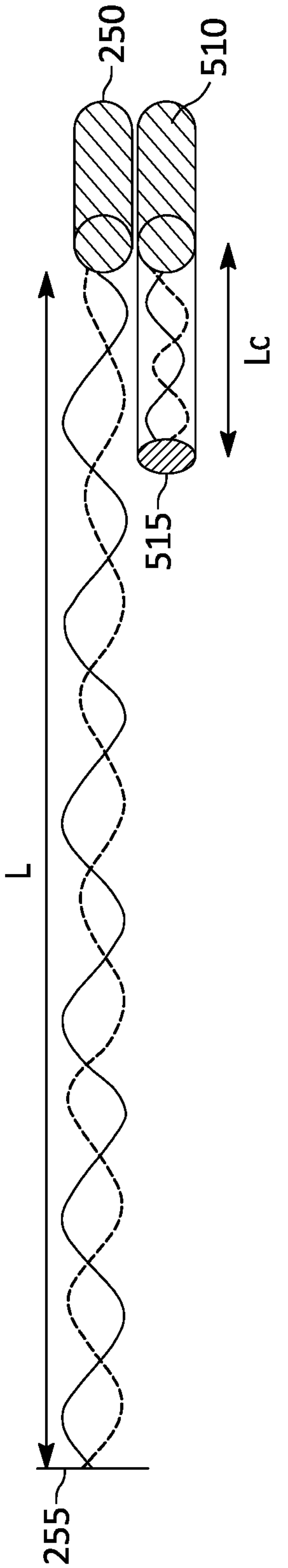
FIGS. 5A and 5B are illustrations of sensor systems with calibration in accordance with some embodiments.

In some embodiments, the calibration may be performed based on a calibration measurement taken inside the effector actuator 260. In some embodiments, the calibration measurement may be made contemporaneously with the distance measurement in step 320. In some embodiments, the calibration measurement may be performed at lower, same, or higher frequency compared to the distance measurement in step 320. In some embodiments, as shown in FIG. 5A, the effector actuator 260 includes a separate calibration sensor 510 positioned at a known distance Lc from a calibration surface 515. The calibration sensor 510 may be a second TOF sensor. The calibration surface 515 may be an existing static part of the effector actuator 260 or a surface specifically added to the effector actuator 260 for calibration. For example, the calibration surface 515 may be coupled to the calibration sensor 510 at a fixed distance. The engine controller 210 may use the travel time (TOFc) measured by the calibration sensor 510 and the known distance (Lc) to the calibration surface 515 to determine the speed of the wave through the medium (C) at the current operating condition based on TOFc=2*Lc/C. For example, if a calibration sensor 510 positioned at 4 cm from a calibration surface 515 measures a TOFc of 1 ms, C of the medium under that current operating condition may be determined to be 0.0125 s/m. The speed of the wave through the medium may then be used to determine the distance L between the TOF sensor 250 and the reflecting surface 255 being measured. For example, when the TOF sensor 250 measures a TOF of 2 ms under the sane operating condition, L can be determined according to TOF/2/0.125 s/m=8 cm.

Figure 5B:
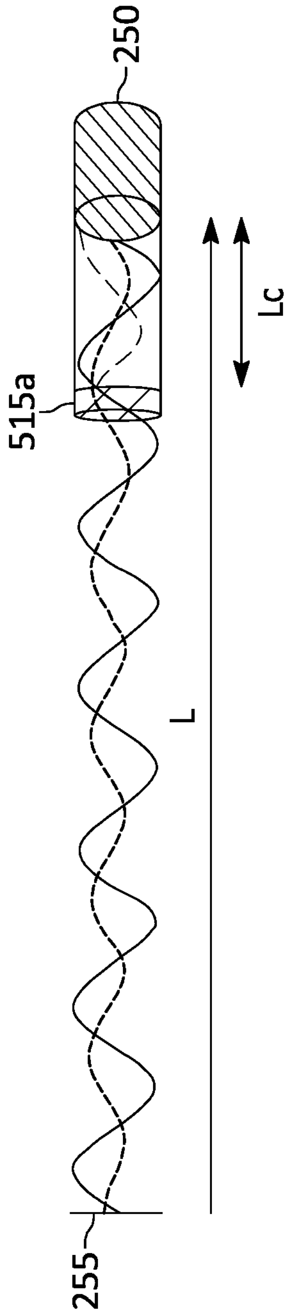

In other embodiments, as shown in FIG. 5B, instead of a separate calibration sensor, the effector actuator 260 may include a calibration surface 515*a* configured to reflect a part of a wave transmitted by the TOF sensor 250 while allowing a remaining wave to pass through to the reflecting surface 255 being measured. The calibration surface 515*a* may, for example, be a low-density or mixed-density solid. The speed of the wave through the medium (C) can be similarly derived based on the known Lc to the calibration surface 515*a* in this configuration to calibrate the distance L measurement.

In step 330, the engine controller 210 determines an effector position based on the distance measured in step 320. In some embodiments, the engine controller 210 may store an equation or a lookup table for converting the measured distance to the reflecting surface (e.g., centimeter) to an effector position (e.g., pitch angle).

In step 340, the engine controller 210 sends a signal to change the effector position at least partially based on the effector position determined in step 330. For example, the engine controller 210 may compare the measured position with a target position determined based on an engine schedule and/or flight control input. The engine controller 210 may actuate the effector 265 open or close to match the target position based on the measured effector position. In some embodiments, the engine controller 210 may incrementally instruct the effector actuator 260 to modify the position of the effector 265 until the measured effector position reaches the target position. In some embodiments, the engine controller 210 may use the measured effector position to confirm successful actuation of the effector 265 and generate an alert or modify the controls of other effectors if the target effector position cannot be achieved.

With the system shown in FIG. 2 and the process shown in FIG. 3, a compact sensor system is provided within an effector actuator 260, which reduces overall sensor envelope and increases sensor reliability. The sensor system may further be self-correcting/compensating to maintain distance measurement accuracy under different operating conditions.

Further aspects of the disclosure are provided by the subject matter of the following clauses:

A system for engine effector position measurement includes an effector actuator of an engine, the effector actuator including a house and one or more movable elements for changing an effector position of an effector coupled to the effector actuator; and a time-of-flight (TOF) sensor within a housing of the effector actuator and positioned to measure a distance between the TOF sensor and a reflecting surface within the housing to determine the effector position of the effector.

The system of any preceding clauses, wherein the TOF sensor is mounted on a static portion of the effector actuator and the reflecting surface is a surface of a movable element.

The system of any preceding clauses, wherein the TOF sensor is mounted on a movable element and the reflecting surface is a surface of a static portion of the effector actuator.

The system of any preceding clauses, wherein the effector actuator includes a blade pitch actuator, a stator vane actuator, an inlet guide vane pitch actuator, an outlet guide vane pitch actuator, a bleed valve actuator, or a variable nozzle actuator.

The system of any preceding clauses, wherein the one or more movable elements include a linear motion component of the effector actuator.

The system of any preceding clauses, wherein the TOF sensor includes an ultrasonic sensor.

The system of any preceding clauses, further includes a calibration sensor including a second TOF sensor and a calibration surface at a known distance from the second TOF sensor, wherein the distance is measured based on calibrating a travel time measured by the TOF sensor based on a calibration travel time measured by the calibration sensor.

The system of any preceding clauses, further includes a calibration surface at a known distance from the TOF sensor, and wherein the distance is measured based on calibrating a travel time associated with the reflecting surface based on a calibration travel time associated with the calibration surface.

The system of any preceding clauses, wherein the calibration surface is configured to reflect a part of a wave transmitted by the TOF sensor while allowing a remaining wave to pass through to the reflecting surface.

The system of any preceding clauses, wherein the TOF sensor is positioned inside a cavity filled with a working fluid of the effector actuator.

The system of any preceding clauses, wherein the one or more movable elements include a piston that linearly displaces with changing of the effector position.

The system of any preceding clauses, wherein the effector actuator is coupled to rotating fan blades of the engine.

The system of any preceding clauses, wherein the effector actuator is coupled to stationary vanes of the engine.

The system of any preceding clauses, wherein the reflecting surface is rotating within the housing of the effector actuator.

A method for engine effector position measurement includes measuring, with a time-of-flight (TOF) sensor within a housing of an effector actuator of an engine, a distance between the TOF sensor and a reflecting surface within the housing, wherein the effector actuator including a static portion and one or more movable elements for changing an effector position of an effector coupled to the effector actuator; and determining, with a processor, the effector position of the effector based on the distance measured by the TOF sensor; and controlling, from the processor, the effector actuator based on the effector position.

The method of any preceding clauses, wherein the effector actuator includes a blade pitch actuator, a stator vane actuator, an inlet guide vane pitch actuator, an outlet guide vane pitch actuator, a bleed valve actuator, and a variable nozzle actuator.

The method of any preceding clauses, wherein the distance is measured based on calibrating a travel time measured by the TOF sensor based on a calibration travel time measured by a calibration sensor, wherein the calibration sensor including a second TOF sensor and a calibration surface at a known distance from the second TOF sensor.

The method of any preceding clauses, further wherein the distance is measured based on calibrating a travel time associated with the reflecting surface using a speed of wave traveling through a medium determined based on a calibration travel time associated with a calibration surface at a known distance from the TOF sensor.

The method of any preceding clauses, wherein the calibration surface is configured to reflect a part of a wave transmitted by the TOF sensor while allowing a remaining wave to pass through to the reflecting surface.

The method of any preceding clauses, wherein the TOF sensor is positioned inside a cavity filled with a working fluid of the effector actuator.

A system for engine effector position measurement including: a time-of-flight (TOF) sensor within a housing of an effector actuator of an engine, the effector actuator including a static portion and one or more movable elements for changing an effector position of an effector coupled to the effector actuator, wherein the TOF sensor is positioned to measure a distance between the TOF sensor and a reflecting surface within the housing; and a processor configured to determine the effector position of the effector based on the distance measured by the TOF sensor.

The system of any of the preceding clauses, wherein the TOF sensor is mounted on the static portion of the effector actuator and the reflecting surface is a surface of a movable element.

The system of any of the preceding clauses, wherein the TOF sensor is mounted on a movable element of the effector actuator and the reflecting surface is a surface of the static portion.

The system of any of the preceding clauses, wherein the effector actuator includes a blade pitch actuator, a stator vane actuator, an inlet guide vane pitch actuator, an outlet guide vane pitch actuator, a bleed valve actuator, or a variable nozzle actuator.

The system of any of the preceding clauses, wherein the one or more movable elements include a linear motion component of the effector actuator.

The system of any of the preceding clauses, wherein the TOF sensor includes an ultrasonic sensor.

The system of any of the preceding clauses, further including a calibration sensor including a second TOF sensor and a calibration surface at a known distance from the second TOF sensor, wherein the distance is measured based on calibrating a travel time measured by the TOF sensor based on a calibration travel time measured by the calibration sensor.

The system of any of the preceding clauses, further including a calibration surface at a known distance from the TOF sensor, and wherein the distance is measured based on calibrating a travel time associated with the reflecting surface based on a calibration travel time associated with the calibration surface.

The system of any of the preceding clauses, wherein the calibration surface is configured to reflect a part of a wave transmitted by the TOF sensor while allowing a remaining wave to pass through to the reflecting surface.

The system of any of the preceding clauses, wherein the TOF sensor is positioned inside a cavity filled with a working fluid of the effector actuator.

The system of any of the preceding clauses, wherein the one or more movable elements include a piston that linearly displaces with changing of the effector position.

The system of any of the preceding clauses, wherein the effector actuator is coupled to rotating fan blades of the engine.

The system of any of the preceding clauses, wherein the effector actuator is coupled to stationary vanes of the engine.

The system of any of the preceding clauses, wherein the reflecting surface is rotating within the housing of the effector actuator.

A method for engine effector position measurement, the method including measuring, with a time-of-flight (TOF) sensor within a housing of an effector actuator of an engine, a distance between the TOF sensor and a reflecting surface within the housing, wherein the effector actuator includes a static portion and one or more movable elements for changing an effector position of an effector coupled to the effector actuator; and determining, with a processor, the effector position of the effector based on the distance measured by the TOF sensor.

The method of any of the preceding clauses, wherein the TOF sensor is mounted on the static portion of the effector actuator and the reflecting surface is a surface of a movable element.

The method of any of the preceding clauses, wherein the TOF sensor is mounted on a movable element of the effector actuator and the reflecting surface is a surface of the static portion.

The method of any of the preceding clauses, wherein the effector actuator includes a blade pitch actuator, a stator vane actuator, an inlet guide vane pitch actuator, an outlet guide vane pitch actuator, a bleed valve actuator, and a variable nozzle actuator.

The method of any of the preceding clauses, wherein the one or more movable elements include a linear motion component of the effector actuator.

The method of any of the preceding clauses, wherein the TOF sensor includes an ultrasonic sensor.

The method of any of the preceding clauses, wherein the distance is measured based on calibrating a travel time measured by the TOF sensor based on a calibration travel time measured by a calibration sensor, wherein the calibration sensor includes a second TOF sensor and a calibration surface at a known distance from the second TOF sensor.

The method of any of the preceding clauses, further wherein the distance is measured based on calibrating a travel time associated with the reflecting surface based on a calibration travel time associated with a calibration surface at a known distance from the TOF sensor.

The method of any of the preceding clauses, wherein the calibration surface is configured to reflect a part of a wave transmitted by the TOF sensor while allowing a remaining wave to pass through to the reflecting surface.

The method of any of the preceding clauses, wherein the TOF sensor is positioned inside a cavity filled with a working fluid of the effector actuator.

The method of any of the preceding clauses, wherein the one or more movable elements include a piston that linearly displaces with changing of the effector position.

The method of any of the preceding clauses, wherein the effector actuator is coupled to rotating fan blades of the engine.

The method of any of the preceding clauses, wherein the effector actuator is coupled to stationary vanes of the engine.

The method of any of the preceding clauses, wherein the reflecting surface is rotating within the housing of the effector actuator.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

The invention claimed is:

1. A system for engine effector position measurement, comprising:
- an effector actuator of an engine, the effector actuator comprising a housing and one or more movable elements for changing an effector position of an effector coupled to the effector actuator; and
- a time-of-flight (TOF) sensor within the housing of the effector actuator and positioned to measure a distance between the TOF sensor and a reflecting surface within the housing to determine the effector position of the effector,
- wherein the TOF sensor is mounted on a movable element of the effector actuator and the reflecting surface is a surface of a static portion of the effector actuator.

2. The system of claim 1, wherein the effector actuator comprises one or more of a blade pitch actuator, a stator vane actuator, an inlet guide vane pitch actuator, an outlet guide vane pitch actuator, a bleed valve actuator, or a variable nozzle actuator.

3. The system of claim 1, wherein the one or more movable elements comprise a linear motion component of the effector actuator.

4. The system of claim 1, wherein the TOF sensor comprises an ultrasonic sensor.

5. The system of claim 1, further comprising a calibration sensor comprising a second TOF sensor and a calibration surface at a known distance from the second TOF sensor, wherein the distance is measured based on calibrating a travel time measured by the TOF sensor based on a calibration travel time measured by the calibration sensor.

6. The system of claim 1, further comprising a calibration surface at a known distance from the TOF sensor, and wherein the distance is measured based on calibrating a travel time associated with the reflecting surface based on a calibration travel time associated with the calibration surface.

7. A system for engine effector position measurement, comprising:
- an effector actuator of an engine, the effector actuator comprising a housing and one or more movable elements for changing an effector position of an effector coupled to the effector actuator;
- a time-of-flight (TOF) sensor within the housing of the effector actuator and positioned to measure a distance between the TOF sensor and a reflecting surface within the housing to determine the effector position of the effector; and
- a calibration surface at a known distance from the TOF sensor, wherein the distance is measured based on calibrating a travel time associated with the reflecting surface based on a calibration travel time associated with the calibration surface,
- wherein the calibration surface is configured to reflect a part of a wave transmitted by the TOF sensor while allowing a remaining wave to pass through to the reflecting surface.

8. The system of claim 1, wherein the TOF sensor is positioned inside a cavity filled with a working fluid of the effector actuator.

9. The system of claim 1, wherein the one or more movable elements comprise a piston that linearly displaces with changing of the effector position.

10. The system of claim 1, wherein the effector actuator is coupled to rotating fan blades of the engine.

11. The system of claim 1, wherein the effector actuator is coupled to stationary vanes of the engine.

12. A system for engine effector position measurement, comprising:
- an effector actuator of an engine, the effector actuator comprising a housing and one or more movable elements for changing an effector position of an effector coupled to the effector actuator; and
- a time-of-flight (TOF) sensor within the housing of the effector actuator and positioned to measure a distance between the TOF sensor and a reflecting surface within the housing to determine the effector position of the effector,
- wherein the reflecting surface is rotating within the housing of the effector actuator.

13. A method for engine effector position measurement, comprising:
- measuring, with a time-of-flight (TOF) sensor within a housing of an effector actuator of an engine, a distance between the TOF sensor and a reflecting surface within the housing, wherein the effector actuator comprises a static portion and one or more movable elements for changing an effector position of an effector coupled to the effector actuator, and wherein the TOF sensor is mounted on a movable element of the effector actuator and the reflecting surface is a surface of the static portion of the effector actuator;
- determining, with a processor, the effector position of the effector based on the distance measured by the TOF sensor; and
- controlling, from the processor, the effector actuator based on the effector position.

14. The method of claim 13, wherein the effector actuator comprises one or more of a blade pitch actuator, a stator vane actuator, an inlet guide vane pitch actuator, an outlet guide vane pitch actuator, a bleed valve actuator, or a variable nozzle actuator.

15. The method of claim 13, wherein the distance is measured based on calibrating a travel time measured by the TOF sensor based on a calibration travel time measured by a calibration sensor, wherein the calibration sensor comprises a second TOF sensor and a calibration surface at a known distance from the second TOF sensor.

16. The method of claim 13, wherein the distance is measured based on calibrating a travel time associated with the reflecting surface using a speed of a wave traveling through a medium determined based on a calibration travel time associated with a calibration surface at a known distance from the TOF sensor.

17. A method for engine effector position measurement, comprising:
- measuring, with a time-of-flight (TOF) sensor within a housing of an effector actuator of an engine, a distance between the TOF sensor and a reflecting surface within the housing, wherein the effector actuator comprises a static portion and one or more movable elements for changing an effector position of an effector coupled to the effector actuator;
- determining, with a processor, the effector position of the effector based on the distance measured by the TOF sensor;
- controlling, from the processor, the effector actuator based on the effector position; and
- calibrating a travel time associated with the reflecting surface using a speed of a wave traveling through a medium determined based on a calibration travel time associated with a calibration surface at a known distance from the TOF sensor, wherein the calibration surface is configured to reflect a part of a wave transmitted by the TOF sensor while allowing a remaining wave to pass through to the reflecting surface.

18. The method of claim 13, wherein the TOF sensor is positioned inside a cavity filled with a working fluid of the effector actuator.

19. The system of claim 1, wherein the effector actuator is coupled to variable pitch blades of a fan of the engine.

20. The method of claim 13, wherein the effector actuator is coupled to variable pitch blades of a fan of the engine.

* * * * *